Feb. 14, 1939.  G. K. LEWIS  2,147,260
PROJECTING LANTERN AND METHOD OF USING SAME
Filed Dec. 21, 1936   3 Sheets-Sheet 1

George K. Lewis
INVENTOR.

BY
ATTORNEYS.

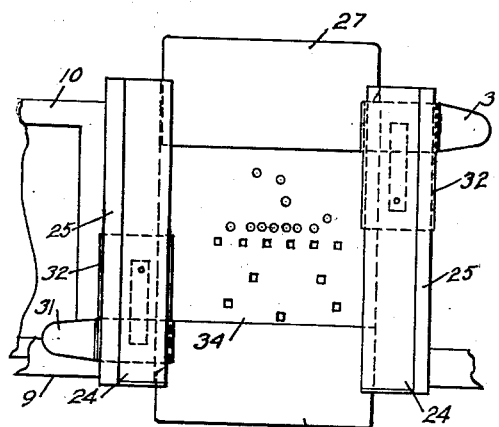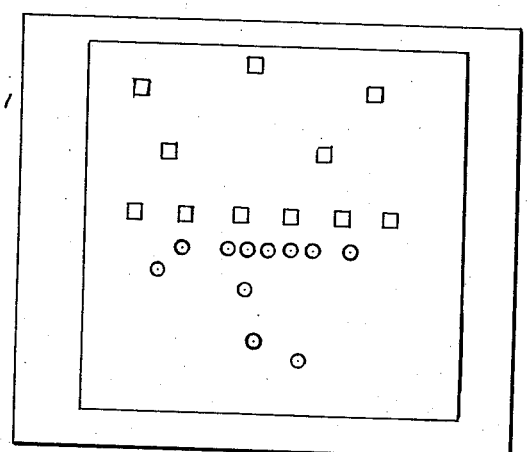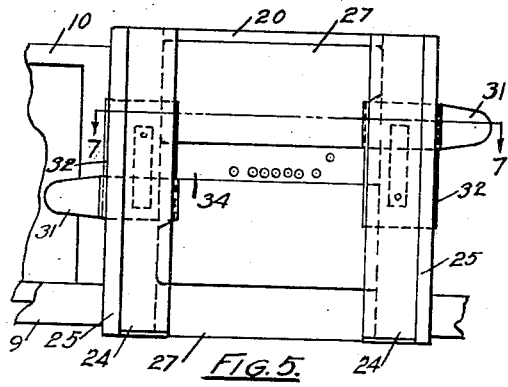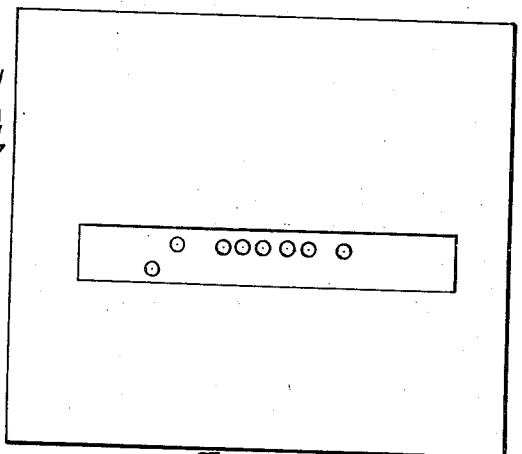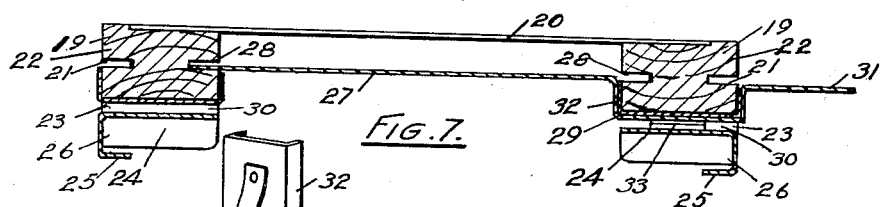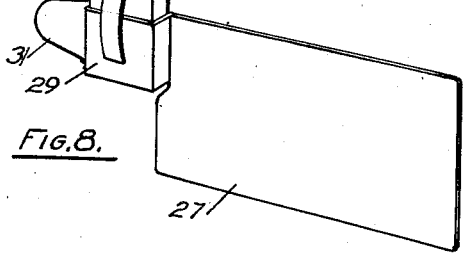

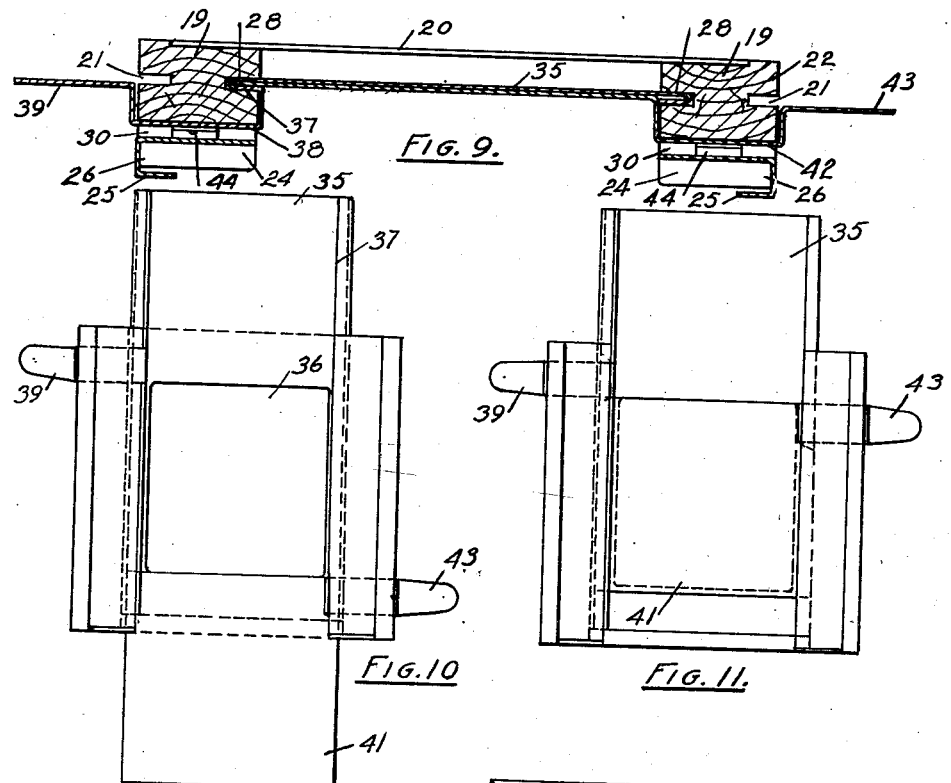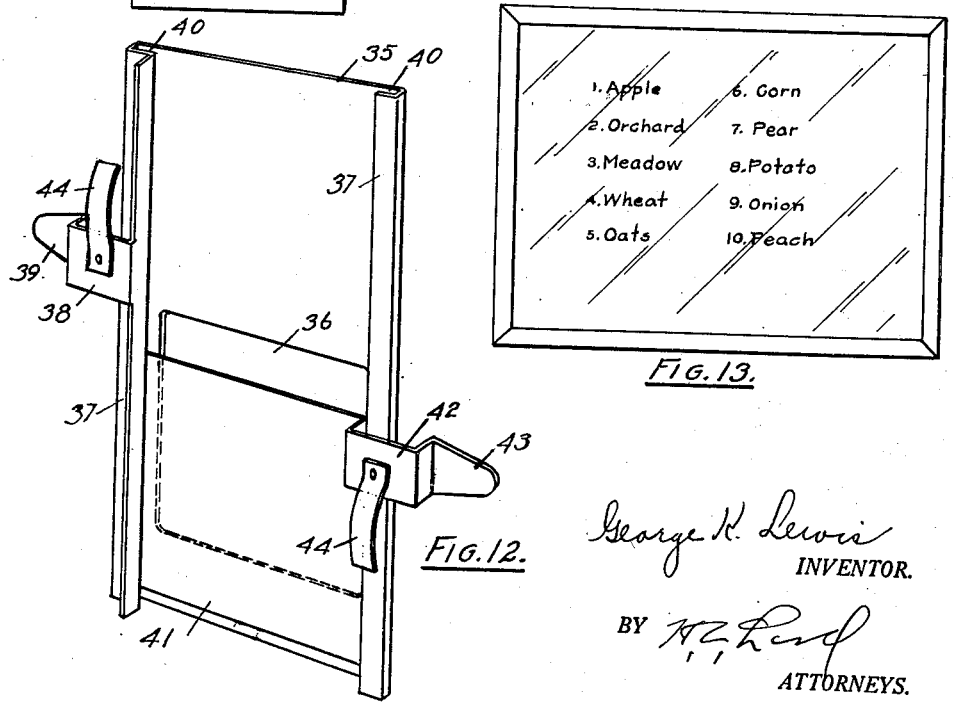

Patented Feb. 14, 1939

2,147,260

UNITED STATES PATENT OFFICE 2,147,260

PROJECTING LANTERN AND METHOD OF USING SAME

George K. Lewis, Meadville, Pa., assignor to Keystone View Company, Meadville, Pa., a corporation of Pennsylvania Application December 21, 1936, Serial No. 116,885

3 Claims. (Cl. 88—26)

The present invention is designed to so arrange and use a projecting lantern as to give instruction with relation to selected subject matter on the slides used. In carrying out the invention a shutter mechanism is interposed, preferably in connection with the slide support, by means of which different zones of the slide may be selectively exposed, thus emphasizing the subject matter selected and concentrating the attention on the selected subject matter. Specific uses or applications of the device and its method of use will be set forth in the following specification. Details of the invention will more fully appear in the specification and claims.

Figure 1:
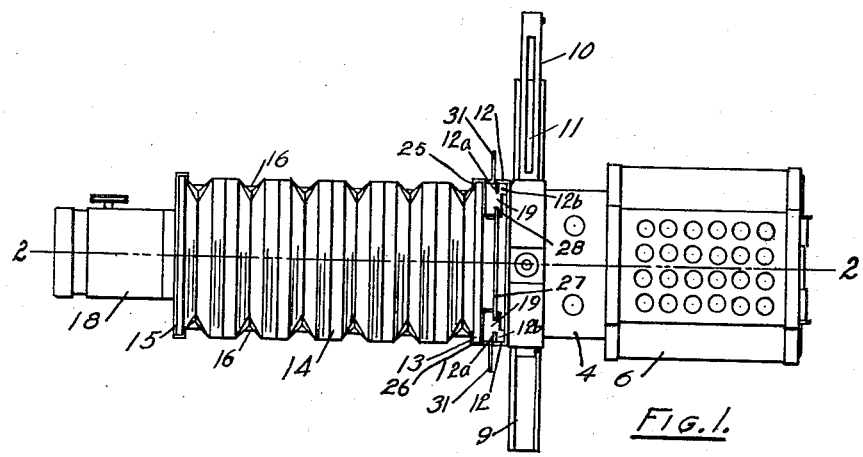

A preferred embodiment of the lantern embodying the invention is illustrated in the accompanying drawings as follows:

Fig. 1 shows a plan view of the lantern.

Figure 2:
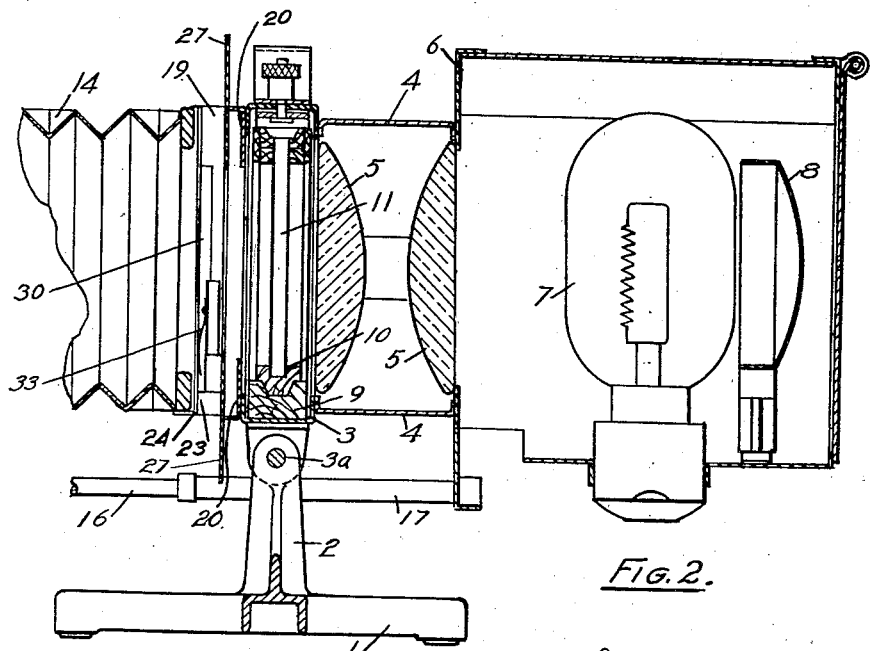

Fig. 2 a section on the line 2—2.

Fig. 3 a view of a shutter and slide from the projecting end of the lantern with the entire slide exposed.

Fig. 4 the projected view from the setting in Fig. 3

Fig. 5 a view similar to Fig. 3 but with a smaller exposed zone of the slide.

Fig. 6 the projected view from the setting in Fig. 5.

Fig. 7 a section on the line 7—7 in Fig. 5.

Fig. 8 a perspective view of one of the shutters.

Fig. 9 a sectional view of a shutter mechanism of alternative design.

Fig. 10 an elevation of the shutter mechanism shown in Fig. 9 with a wide open shutter.

Fig. 11 the same mechanism with the shutter closed.

Fig. 12 a perspective view of the shutters detached in the structure.

Fig. 13 a detached view of a slide having different subject matter than that of the other views.

The lantern is an ordinary projecting lantern. It is provided with a base 1, standard 2, a slide support 3 pivotally mounted at 3a on the standard. A rearward frame 4—4 extends from the slide support and this carries the condensing lenses 5—5 and a lamp house 6. Lamp 7 is arranged in the lamp house and a reflector 8 arranged back of the lamp. A slide holder is provided with a normally stationary frame 9 which can be slidably assembled in the holder. The frame 9 carries a movable slide holder 10, this being provided with slots 11 to receive the slide, it being understood that the holder is provided with two slots 11, one of which is in central position but not exposed in Fig. 1.

At the front of the slide support there is a connection which is made by the flange plates 12 secured to the support. These plates have the inturned edges 12a which provide vertical grooves 12b into which the edges 13 of the bellows 14 may be placed, the bellows providing the flexibility for permitting the assembly.

At the front end of the bellows there is a standard 15 which is mounted on a rod 16, the rod being slidingly mounted in the hollow support 17 carried by the slide support. Focusing lens mechanism 18 is arranged on the standard 15, the slide 16 and the bellows, permitting the movement of the parts. The lens mechanism has the usual adjusting attachments. These parts are identical or may be identical with the ordinary commercial lamp.

I provide a shutter mechanism which is interposed between the slide support and the bellows. This shutter mechanism comprises a shutter frame made up of side uprights 19 and crossplates 20, the space between the cross-plates making the opening through the shutter. The uprights have slots 21 forming lips 22 which are adapted to fit in the grooves 12b, the slots receiving the inturned edges 12a on the slide support. The bottoms and tops of the frame sides 19 have projections 23, and a flanged plate 24 is secured at each side part of the frame on the faces of these projections. This flanged plate has inturned edges 25 which correspond to the inturned edges 12a, and a groove 26 is thus formed which is adapted to receive the rear end of the bellows, so that the interlocking parts, namely, the flanged plate 12 and the rear end of the bellows 13, correspond to the flanged plate 24 and lip 12b respectively. In other words, these connecting parts are interchangeable so that the shutter mechanism may be inserted and used, or, if desired, it may be detached and the bellows reconnected direct to the slide support and the lantern used in the ordinary manner. This manner of making a shutter mechanism also makes it possible to supply it as an accessory for lanterns already in use.

The shutter mechanism as shown in Figs. 1 to 8 involves similar top and bottom shutter plates 27. The ends of each plate extend into slots 28 so that the plate is slidably movable between the edges. Extending from each plate is a channel shaped extension 29 which is struck up from the edge of each plate, these extensions passing through the slots 30 between the plates 24 and the side frames 19, the projections 23 affording the outsetting of the plates sufficiently to form the slots. The extension 29 terminates in a handle 31. The top shutter plate has the handle at the bottom of that plate and at one side of the shutter frame. The bottom plate has the handle at the top of the plate and the handle at the opposite side of the frame from that of the top plate. In other words, the bottom plate is merely turned half around from the top plate. Arranged within the channel portion of the extension 29 is a channel shaped guide piece 32 which extends along the face and side edges of frame side 19. This guide channel extends upwardly from the extension 29 of the bottom plate and downwardly from the extension 29 of the upper plate, the guide giving a longer bearing to give a sliding movement to the shutter plates. Each plate is provided with a friction spring 33 which is arranged on the guide plate and rubs the plate 24 opposite the extension 29. With this arrangement the operator may adjust the shutters so as to close them down to a small narrow slot and this slot may be located near the top or near the bottom. This affords a use of the lantern in the way of instruction that is desirable.

In Figs. 3 to 6 there is illustrated a slide 34 on which are placed a series of symbols, one series being of disc form and the other series rectangular symbols. These symbols are eleven in number, corresponding to the number of players usually involved in football. The instructor by the use of the slides may expose initially only a formation of one side, and may call for an answering formation of the opposing side before exposing that side. Or the instructor may expose only other portions of the entire line or backfield calling for an expression of answering formation. This exposure of parts of the eleven also concentrates the attention on that part which is under discussion and this may be selected as desired, as indicated in the views Figs. 4 and 6 which are projected from the slide 34. If desired, a slide such as indicated in Fig. 13 may be used, this being used in assisting in instructing in spelling and by selecting a single word or pair of words and covering the balance attention may be concentrated on that word and that word subsequently blanked out for a test as to this word. A very large number of uses for the purpose of instruction are thus indicated.

In the modification shown in Figs. 8, 10, 11 and 12 the same shutter frame is used but the shutter structure is slightly different. In this modification the lower shutter is slidingly mounted in the upper shutter so that when adjusted for a width of zone, the single adjustment of the upper shutter shifts this opening by the manipulation of the single handle. The shutter structure is as follows: The shutter 35 has an opening 36 and inturned edges 37. An extension 38 is provided at one side of this shutter and extends through the slot 30 in the frame and is provided with a handle 39. The inturned edges 37 are slidingly mounted in the slots 28.

The shutter 41 extends into the slots 40 and is shaped very similar to the lower shutter 27. It has an extension 42 which extends through the slot 30 at the opposite side from the extension 38 and is provided with a handle 43 by means of which this shutter may be adjusted relatively to the other shutter to fix the opening 36.

A spring 44 is provided for the extension 38 and a spring 45 is provided which operates on the face of the groove 40 to maintain the adjustment of one shutter relatively to the other.

What I claim as new is:

1. In combination with a projecting lantern having a projecting lens; a slide support providing a projection aperture, of a shutter mechanism positioned at the projection aperture, comprising guiding means including a rectangular frame having two substantially parallel side pieces, top and bottom connections between the side pieces, and two shutter plates carried by the means, said means comprising channel shaped guide members secured to the frame; each of said plates provided with channel shaped members for frictionally and slidably retaining said plates on said guide members, the plates being movable independently or in unison, to vary the extent and position of the opening, controlling the projected field from the slide, and a handle projecting rigidly and laterally from each of said channel shaped members on the plates.

2. In combination with a projecting lantern having a projecting lens; a slide support providing a projection aperture; of a shutter mechanism comprising channel shaped guiding means and two shutter plates; channel shaped members on the plates cooperating with the channel shaped guiding means enabling the plates to be moved on said guiding means; means connecting the two shutter plates whereby the plates may be moved as an assembly or relative to each other to vary the extent of the projected field; and handles extending laterally from said plates.

3. In combination with a projecting lantern having a projecting lens; a slide support providing a projection aperture, of a shutter mechanism positioned at the projection aperture, comprising guiding means including a rectangular frame having two substantially parallel side pieces, top and bottom connections between the side pieces, and two shutter plates carried by the means, said means comprising channel shaped guide members secured to the frame; each of said plates provided with channel shaped members for frictionally and slidably retaining said plates on said guide members, a flat spring secured to a channel shaped guide member with its free end pressed against a channel member on a plate, thereby enabling the plates to be moved independently or in unison, to vary the extent and position of the opening, controlling the projected field from the slide, and a handle projecting rigidly and laterally from each of said channel shaped members on the plates.

GEORGE K. LEWIS.